(12) United States Patent
Freiberger (10) Patent No.: US 11,201,532 B2
(45) Date of Patent: Dec. 14, 2021

(54) ADAPTABLE PRECISION TRIGGERING MECHANISM

(71) Applicant: Honeywell Federal Manufacturing & Technologies, LLC, Kansas City, MO (US)

(72) Inventor: Peter D. Freiberger, Belton, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 126 days.

(21) Appl. No.: 16/709,066

(22) Filed: Dec. 10, 2019

(65) Prior Publication Data

US 2020/0186019 A1 Jun. 11, 2020

Related U.S. Application Data

(60) Provisional application No. 62/777,323, filed on Dec. 10, 2018.

(51) Int. Cl.
*H02K 41/02* (2006.01)
*H02K 41/035* (2006.01)
(Continued)

(52) U.S. Cl.
CPC .............. *H02K 41/02* (2013.01); *H02K 5/04* (2013.01); *H02K 7/08* (2013.01); *H02K 11/20* (2016.01);
(Continued)

(58) Field of Classification Search
CPC .......... H02K 7/06; H02K 41/02; H02K 41/00; H02K 41/025; H02K 41/0354;
(Continued)

(56) References Cited

U.S. PATENT DOCUMENTS 10,533,908 B1 * 1/2020 Freiberger ................ G01L 1/04
2011/0257626 A1 * 10/2011 Hunter ..................... A61M 5/30
604/503

(Continued)

*Primary Examiner* — Quyen P Leung
*Assistant Examiner* — Alexander A Singh
(74) *Attorney, Agent, or Firm* — Hovey Williams LLP (57) ABSTRACT

A precision triggering mechanism for engaging a portion of a device and a method of using the same are provided. The mechanism comprises an electric linear motor, a force limiter, a force sensor, an engagement slide, and a controller. The electric linear motor includes a drive rod, a driver that applies a force to the drive rod to move the drive rod linearly, and a sensor for detecting a linear position of the drive rod. The force limiter is connected to the drive rod and is configured to absorb an amount of axial force asserted by the drive rod above a maximum amount. The force sensor is connected to the force limiter and is configured to detect an amount of force applied by the force limiter on the force sensor. The engagement slide includes an end extending from the force sensor for engaging the portion of the device. The controller is configured to receive a signal representative of the linear position of the drive rod from the sensor of the electric linear motor; receive from the force sensor a signal representative of the amount of force applied by the force limiter; and direct the driver of the electric linear motor to apply a force to the drive rod based on at least one of the linear position of the drive rod or the amount of force applied by the force limiter.

20 Claims, 5 Drawing Sheets

(51) Int. Cl.
*H02K 11/20* (2016.01)
*H02K 7/08* (2006.01)
*H02K 11/33* (2016.01)
*H02K 5/04* (2006.01)

(52) U.S. Cl.
CPC ......... *H02K 11/33* (2016.01); *H02K 41/0354* (2013.01); *H02K 41/0356* (2013.01)

(58) Field of Classification Search
CPC .... H02K 41/03; H02K 41/031; H02K 41/033; H02K 41/035; H02K 41/0352; H02K 41/0356; H02K 11/20; H02K 11/33; H02K 5/04; H02K 7/08
USPC ......... 310/12.01, 12.02, 12.05, 12.16, 12.17, 310/12.18, 12.19, 12.32
See application file for complete search history.

(56) References Cited

U.S. PATENT DOCUMENTS

| | | | |
|---|---|---|---|
| 2014/0103745 A1* | 4/2014 | Schulz | H02K 15/16 310/12.04 |
| 2017/0197032 A1* | 7/2017 | Demas | G01L 5/1627 |

* cited by examiner

ADAPTABLE PRECISION TRIGGERING MECHANISM

RELATED APPLICATIONS

The present non-provisional patent application claims priority of U.S. Provisional Patent Application Ser. No. 62/777,323 filed on Dec. 10, 2018, and entitled "ADAPTABLE PRECISION TRIGGERING MECHANISM," which is hereby incorporated herein in its entirety by reference.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Triggering mechanisms are often used to thoroughly test devices for longevity and durability. For example, a triggering mechanism may be used to test a button on a device. The triggering mechanism may be configured to repeatedly push on the button a certain number of times, for a period of time, or until failure of the button. Triggering mechanisms often include a driver, such as a hydraulic piston, and a rod for engaging buttons or other components.

Buttons or other components of devices subject to testing have varying degrees of designed durability. For example, some buttons may be designed to withstand extreme forces during use and therefore have high durability. Other buttons may be more delicate and designed to experience relatively smaller forces with normal use. Additionally, some devices are also intricate in that they can only be engaged in a specific manner. For example, an intricate button may be intended to be depressed only a relatively short distance. Therefore, triggering mechanisms configured to test durable devices do not provide accurate testing for more intricate devices because the forces applied do not reflect normal use and often cause premature failure.

The background discussion is intended to provide information related to the present invention which is not necessarily prior art.

SUMMARY

The present invention solves the above-described problems and other problems and provides a distinct advance in the art of triggering mechanisms. More particularly, the present invention provides a precision triggering mechanism that has an adjustable force limit and precise actuation for more accurate testing.

A precision triggering mechanism constructed in accordance with embodiments of the present invention broadly includes an electric linear motor, a force limiter, a force sensor, an engagement slide, and a controller. The electric linear motor includes a drive rod, a driver that applies a force to the drive rod to move the drive rod linearly, and a sensor for detecting a linear position of the drive rod. The force limiter is connected to the drive rod and is configured to absorb an amount of axial force asserted by the drive rod above a maximum amount. The force sensor is connected to the force limiter and is configured to detect an amount of force applied by the force limiter on the force sensor. The engagement slide has an end extending from the force sensor for engaging the portion of the device.

The controller is configured to receive a signal representative of the linear position of the drive rod from the sensor of the electric linear motor, receive from the force sensor a signal representative of the amount of force applied by the force limiter, and direct the driver of the electric linear motor to apply a force to the drive rod based on at least one of the linear position of the drive rod or the amount of force applied by the force limiter. By using the position of the drive rod or the amount of force applied by the force limiter, the precision trigger mechanism is operable to push a button or other portion of the device being tested a precise distance with a precise force. Additionally, in case of failure, the force limiter provides back-up protection to avoid damage to the device.

Another embodiment of the invention is a method of engaging a portion of an object. The method includes directing, via a controller, a driver of an electric linear motor to drive a drive rod outwardly to cause a tip of an engagement slide to engage the portion of the object; receiving, from a sensor of the electric linear motor, a signal representative of a position of the drive rod; receiving, from a force sensor, a signal representative of an amount of force applied by a force limiter connected to the drive rod on the force sensor; and adjusting, via the controller, a parameter of the driver of the electric linear motor based on at least one of the position of the drive rod or the amount of force applied by the force limiter on the force sensor.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
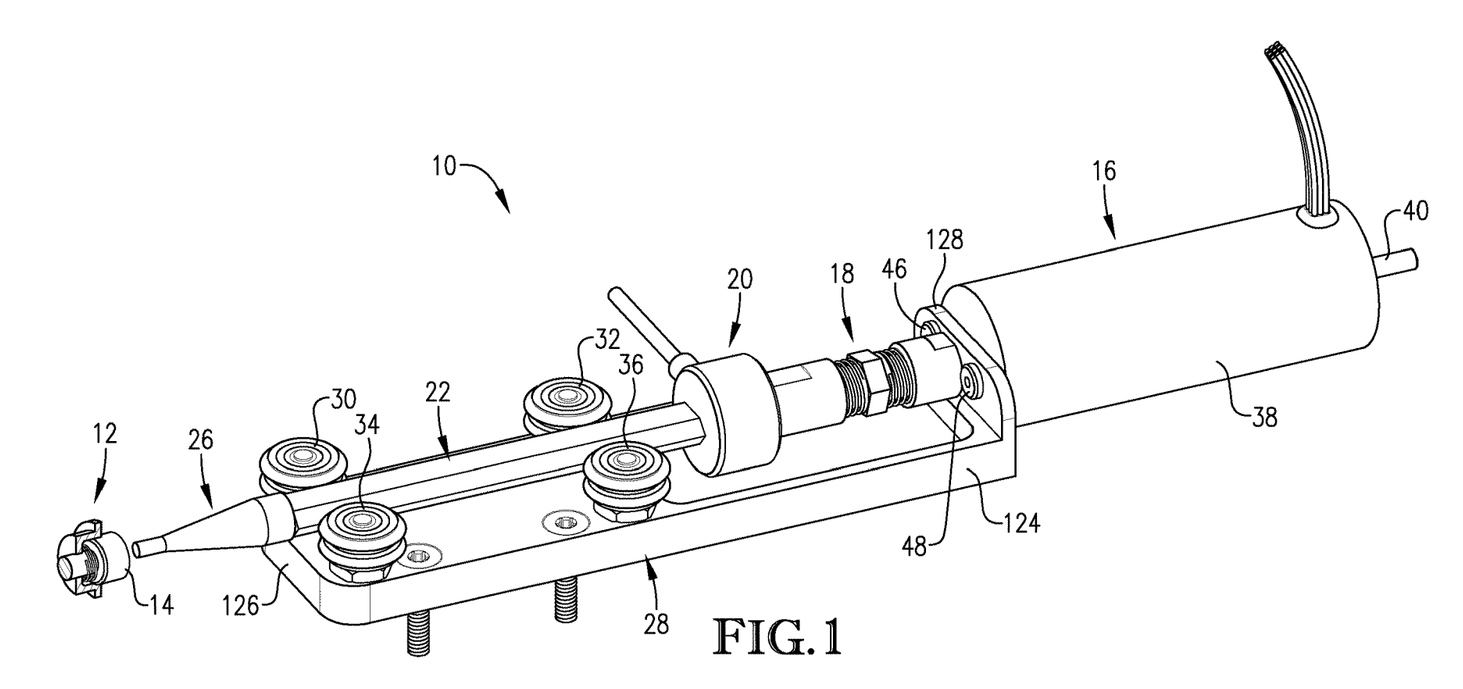
FIG. 1 is perspective view of an adaptable precision triggering mechanism constructed in accordance with embodiments of the present invention.

Turning to FIG. 1, an adaptable precision triggering mechanism 10 constructed in accordance with an embodiment of the present invention is illustrated. The triggering mechanism 10 may be implemented for various applications, including for testing devices 12 or objects for longevity and durability. For example, the triggering mechanism 10 may be configured to repeatedly engage a button 14, or other portion, of the device 12 to test the longevity of the button 14 under certain conditions.

The triggering mechanism 10 broadly comprises an electric linear motor 16, a force limiter 18, a force sensor 20, an engagement slide 22, a controller 24, a tip 26, a bracket 28, and one or more guide bearings 30, 32, 34, 36.

Figure 8:
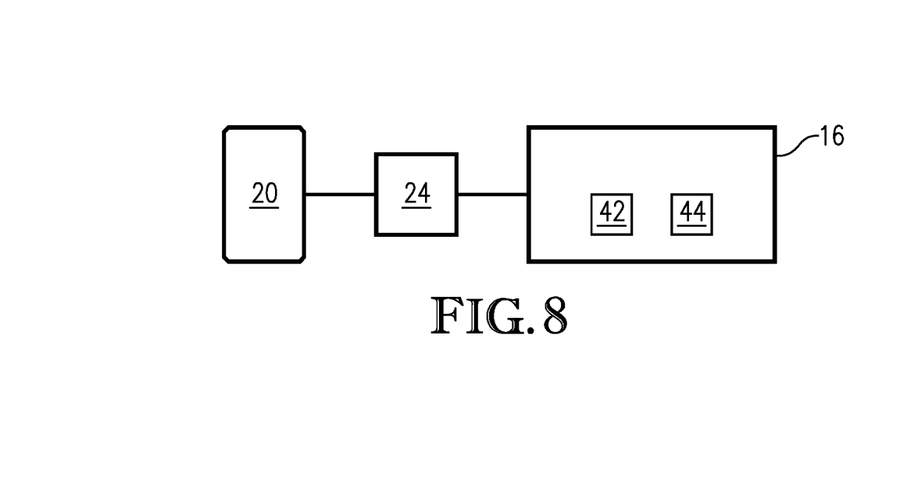
FIG. 8 is a schematic view of a various components of the triggering mechanism of FIG. 1.

The linear motor 16 may be an encoded linear servo motor configured to provide a force to engage the button 14 of the device 12 with positional feedback. The linear motor 16 may comprise a housing 38, a drive rod 40, a driver 42, and a sensor 44 (the driver 42 and sensor 44 are shown in FIG. 8). The housing 38 at least partially encloses and supports the drive rod 40, driver 42, and the sensor 44 and may be attached to the bracket 28 (via fasteners 46, 48) and/or another surface near the device 12. The drive rod 40 extends from the housing 38 and engages the force limiter 18. The drive rod 40 may have an end 50 (shown in FIGS. 2-6) that extends over the bracket 28.

The driver 42 is operable to apply a force to the drive rod 40 to move the drive rod 40 linearly. The driver 42 may move the drive rod 40 relative to the housing 38 and/or the bracket 28. The driver 42 may apply an extension force to the drive rod 40 so that the drive rod 40 extends away from housing 38 toward the device 12, or the driver 42 may apply a retraction force that pulls the drive rod 40 toward the housing 38 and away from the device 12. The driver 42 may have any configuration without departing from the scope of the present invention. For example, the driver 42 may comprise an electromagnetic actuator that uses magnetic forces to move the drive rod 40 linearly; an electric motor that drives gears, a belt, and/or a bell screw to move the drive rod 40 linearly; or an electric motor that uses hydraulic or pneumatic forces to drive a piston that pushes on the drive rod 40.

The sensor 44 of the linear motor 16 detects the position of the drive rod 40 relative to the housing 38 and/or another origin point. The sensor 44 may comprise any type of sensor operable to determine a linear position of the drive rod 40, such as a potentiometer sensor, a laser distance sensor, a capacitance sensor, or the like, without departing from the scope of the present invention.

Figure 2:
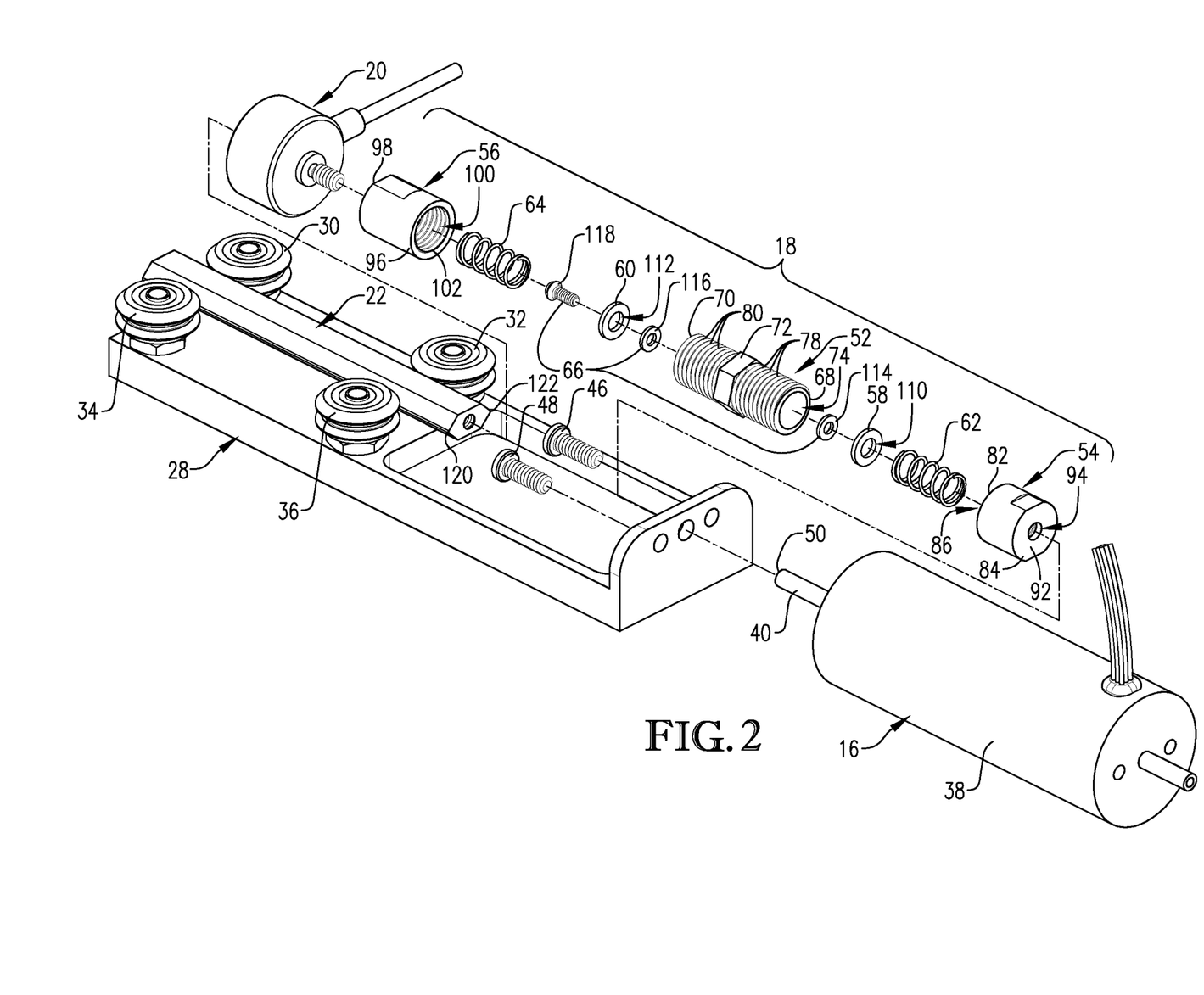
FIG. 2 is an exploded view of the triggering mechanism of FIG. 1.
Figure 3:
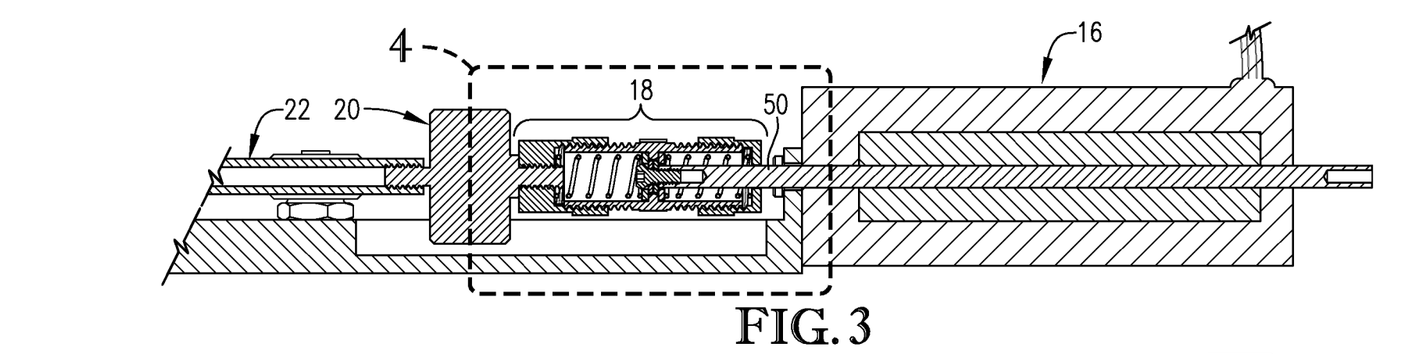
FIG. 3 is a side sectional view of the triggering mechanism of FIG. 1.
Figure 4:
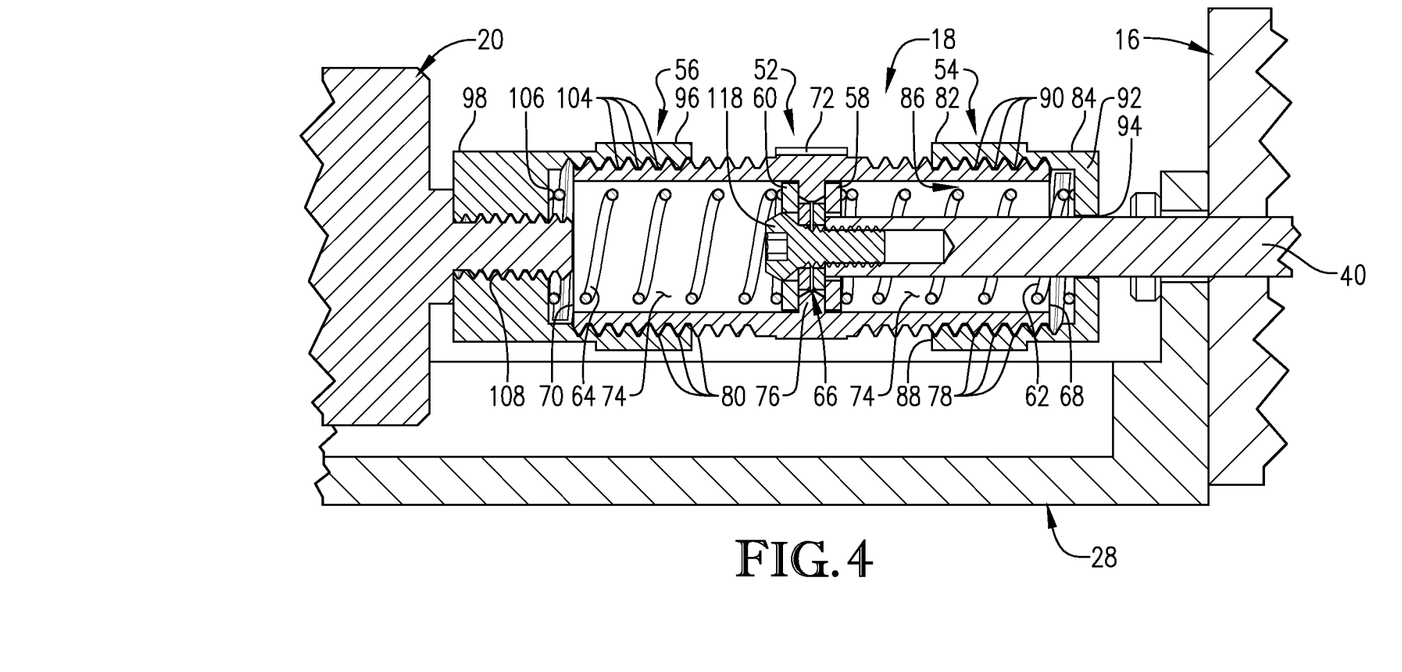
FIG. 4 is a side sectional view of a force limiter of the triggering mechanism of FIG. 1.

Turning to FIG. 2, the force limiter 18 is connected to the drive rod 40 and is configured to absorb an amount of axial force asserted by the drive rod 40 above a maximum amount. The axial force may be in a direction toward the device 12 or away from the device 12. The force limiter 18 may comprise an inner sleeve 52, a rod outer sleeve 54, a sensor outer sleeve 56, a retraction washer 58, an extension washer 60, a retraction spring 62, an extension spring 64, and a spring engagement device 66. The inner sleeve 52 comprises a retraction end 68, an extension end 70 opposite to the retraction end 68, a grip-able portion 72 disposed between the retraction end 68 and the extension end 70, a channel 74 extending from the retraction end 68 through the extension end 70, and an abutment 76 positioned inside the channel 74 between the retraction end 68 and the extension end 70. The retraction end 68 and the extension end 70 may include threads 78, 80 on their outer surfaces for engaging the outer sleeves 54, 56. The grip-able portion 72 may comprise a nut-like surface for being engaged by a wrench, pliers or the like.

The rod outer sleeve 54 connects the force limiter 18 to the end 50 of the drive rod 40 and comprises a coupling end 82, a rod end 84, and a channel 86. The coupling end 82 has an opening 88 that receives a portion of the retraction end 68 of the inner sleeve 52. The coupling end 82 may have grooves 90 operable to engage the threads 78 of the retraction end 68 of the inner sleeve 52. The rod end 84 includes a wall 92 with a through-hole 94 for receiving the drive rod 40. The channel 86 extends from the wall 92 to the opening 88 of the coupling end 82.

The sensor outer sleeve 56 connects the force limiter 18 to the force sensor 20 and comprises a coupling end 96, an attachment end 98, and a channel 100. The coupling end 96 has an opening 102 that receives at least a portion of the extension end 70 of the inner sleeve 52. The coupling end 96 may also have grooves 104 operable to engage the threads 80 of the extension end 70 of the inner sleeve 52. The attachment end 98 may include a wall 106 with a through-hole 108 for receiving and attaching a portion of the sensor 20. The channel 100 extends from the wall 106 to the opening 102 of the coupling end 96.

The retraction washer 58 is positioned inside the channel 74 on the retraction end 68 of the abutment 76 of the inner sleeve 52 and comprises a through-hole 110. The retraction washer 58 has an outer diameter large enough to abut the abutment 76 of the inner sleeve 52 but small enough to move within the channel 74. The radius of the through-hole 110 is large enough for the drive rod 40 to slide therethrough, but small enough the spring engagement device 66 cannot pass through the through-hole 110 so that the spring engagement device 66 abuts the retraction washer 58.

The extension washer 60 is positioned inside the channel 74 on the extension end 70 of the abutment 76 of the inner sleeve 52 and also comprises a through-hole 112. The extension washer 60 has an outer diameter large enough to abut the abutment 76 of the inner sleeve 52 but small enough to move within the channel 74. The radius of the through-hole 112 is large enough for a fastener (discussed below) of the spring engagement device 66 to pass therethrough, but small enough the spring engagement device 66 cannot pass through the through-hole 112 so that the spring engagement device 66 abuts the extension washer 60.

The retraction spring 62 abuts the inner surface of the wall 92 of the rod outer sleeve 54 and extends to the retraction washer 58 inside the channel 74 of the inner sleeve 52. The retraction spring 62 may provide a resilient expansion force between the retraction washer 58 and the wall 92 of the rod outer sleeve 54.

The extension spring 64 abuts the inner surface of the wall 106 of the sensor outer sleeve 56 and extends to the extension washer 60 inside the channel 74 of the inner sleeve 52. The extension spring 64 may provide a resilient expansion force between the extension washer 60 and the wall 106 of the sensor outer sleeve 56.

Figure 5:
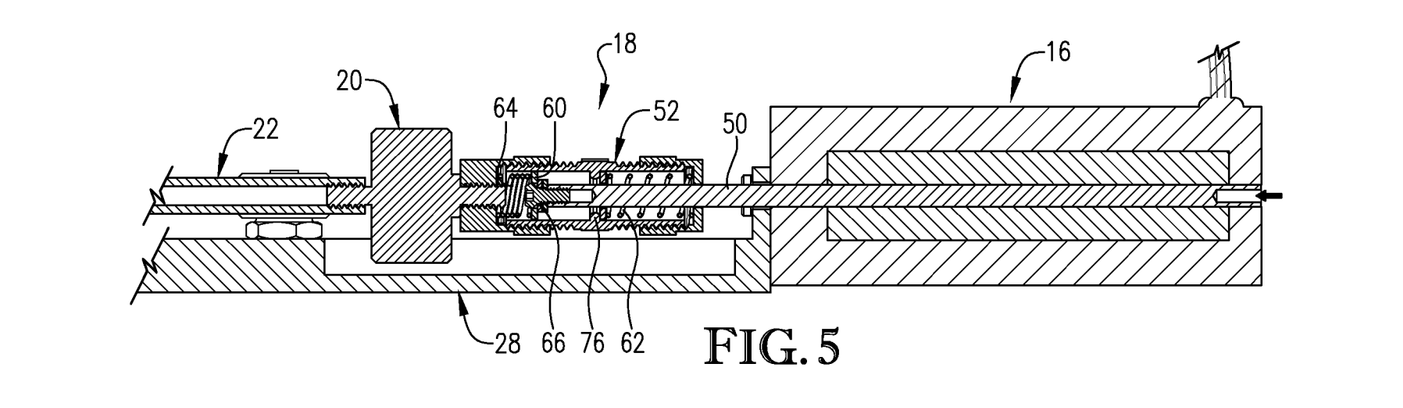
FIG. 5 is a side sectional view of the triggering mechanism of FIG. 1 with the force limiter absorbing an extension force.
Figure 6:
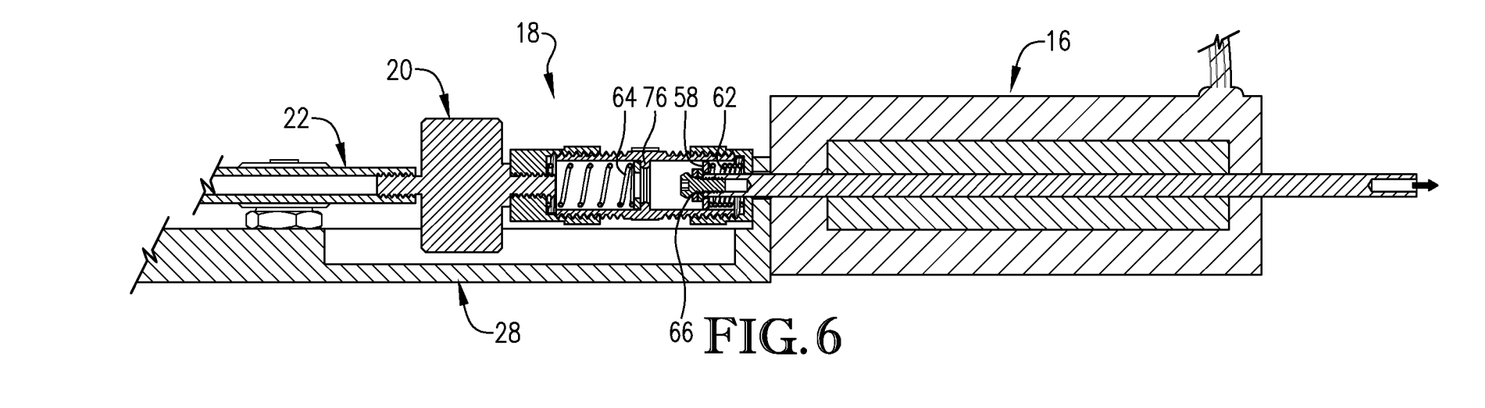
FIG. 6 is a side sectional view of the triggering mechanism of FIG. 1 with the force limiter absorbing a retraction force.

The spring engagement device 66 is attached to the end 50 of the drive rod 40 and is positioned between the retraction washer 58 and the extension washer 60. The spring engagement device 66 may be operable to move past the abutment 76 of the inner sleeve 52 and engage the extension washer 60 when an extension force applied by the drive rod 40 on the force limiter 18 exceeds a maximum extension force, thereby compressing the extension spring 64, as depicted in FIG. 5. The spring engagement device 66 may also be operable to move past the abutment 76 of the inner sleeve 52 and engage the retraction washer 58 when a retraction force applied by the drive rod 40 on the force limiter 18 exceeds a maximum retraction force, thereby compressing the retraction spring 62, as depicted in FIG. 6. The spring engagement device 66 may comprise one or more washers 114, 116 fastened to the end 50 of the drive rod 40 via a fastener 118. The washer 114 has an outer diameter large enough to not pass through the through-hole 110 of the retraction washer 58, but small enough to pass by the abutment 76 of the inner sleeve 52. The washer 116 has an outer diameter large enough to not pass through the through-hole 112 of the extension washer 60, but small enough to pass by the abutment 76 of the inner sleeve 52.

The force sensor 20 is connected to the force limiter 18 and is configured to detect an amount of force applied by the force limiter 18 on the force sensor 20. The detected force may include a force applied toward the device 12 and/or a force applied away from the device 12 (i.e. when the drive rod 40 pulls the force limiter 18). The force sensor 20 may connect the force limiter 18 to the engagement slide 22. The force sensor 20 may communicate with the controller 24 via wired or wireless communication and may be configured to send a signal representative of the detected force to the controller 24.

Figure 7:
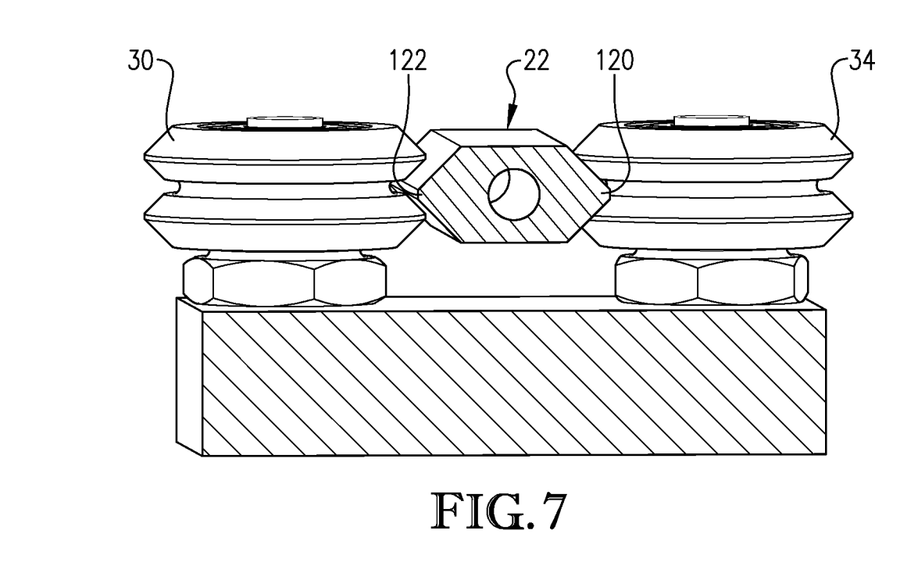
FIG. 7 is a front sectional view of an engagement slide and guide bearings of the triggering mechanism of FIG. 1.

The engagement slide 22 extends from the force sensor 20 and is operable to at least help engage the device 12. As shown in FIG. 7, the engagement slide 22 may have ridges 120, 122 protruding along its sides for engaging the guide bearings 30, 32, 34, 36.

Turning to FIG. 8, the controller 24 controls operation of the trigger mechanism 10 and may comprise any number or combination of controllers, sensors, circuits, integrated circuits, programmable logic devices such as programmable logic controllers (PLC) or motion programmable logic controllers (MPLC), computers, processors, microcontrollers, transmitters, receivers, amplifiers, other electrical and computing devices, and/or residential or external memory for storing data and other information accessed and/or generated by the triggering mechanism 10.

The controller 24 may be in wired or wireless communication with the motor 16 and the force sensor 20. The controller 24 may be configured to receive from the sensor 44 of the motor 16 a signal representative of the linear position of the drive rod 40. The controller 24 may also be configured to receive from the force sensor 20 a signal representative of the amount of force applied by the force limiter 18. The controller 24 may be configured to direct the driver 42 of the motor 16 to apply a force to the drive rod 40 based on at least one of the linear position of the drive rod 40 or the amount of force applied by the force limiter 18. For example, the controller 24 may be configured to direct the driver 42 of the motor 16 to push the drive rod 40 until the linear position of the drive rod 40 is moved near a desired maximum position. Additionally, the controller 24 may be configured to direct the driver 42 of the motor 16 to apply a force the drive rod 40 so that the drive rod 40 retracts and until its linear position does is near a desired minimum position. The controller 24 may also be configured to direct the driver 42 of the motor 16 to push the drive rod 40 so that the amount of force (in the direction of the device 12 and/or away from the device 12) applied by the force limiter 18 does not exceed a desired maximum force.

The desired maximum force is preferably less than the maximum amount of force imposed by the force limiter 18 (i.e. the amount of force beyond which the force limiter 18 absorbs). This enables the triggering mechanism 10 to test the device 12 with any amount of force, and in case of failure of the motor 16 or controller 24, the force limiter 18 absorbs any force beyond the maximum amount of force of the force limiter 18 to avoid damage to the device 12. The controller 24 may be configured to adjust a parameter of the driver 42 of the motor 16 based on the detected position of the drive rod 40 and/or the force detected by the force sensor 20. The parameter may include an amount of electric current provided to the driver 42, a voltage applied to the driver 42, an amount of power provided to the driver 42, an amount of time of operation of the driver 42, or the like.

The tip 26 may be attached to the end of the engagement slide 22 and may be operable to engage the button 14 (or other component) of the device 12. The tip 26 may be made of any material, including a material meant to mimic an object that would engage the button 14 in actual use. The tip 26 may have any shape without departing from the scope of the present invention.

The bracket 28 may support the motor 16 and/or the bearings 30, 32, 34, 36 and include a first end 124, a second end 126 opposite to the first end 124, and a flange 128 extending from the first end 124. The housing 38 of the motor 16 may be attached to the flange 128 via the fasteners 46, 48.

The bearings 30, 32, 34, 36 may be attached to the bracket 28 and guide the engagement slide 22 when the engagement slide 22 moves relative to the bracket 28. The bearings 30, 32, 34, 36 may be rotatably attached to the bracket 28 and include surfaces 130, such as grooves or the like, that engage the ridges 120, 122 of the engagement slide 22. The bearings 30, 32, 34, 36 may be vertically adjustable to provide precise guidance to the engagement slide 22 so that it contacts the device 12 exactly where desired.

An exemplary method of using the triggering mechanism 10 will now be described. The controller 24 may direct the driver 42 to apply a force to the drive rod 40 so that the drive rod 40 moves toward the device 12. The drive rod 40 pushes on the force limiter 18, which—if the force from the drive rod 40 is below the maximum amount—pushes on the force sensor 20 with substantially the same force as the drive rod 40. The force sensor 20 detects the force applied by the force limiter 18, sends a signal representative of the amount of force, and pushes on the engagement slide 22. The controller 24 may receive the signal, determine whether the force is within an allowable range near the desired force, and adjust a parameter of the driver 42 based on the detected force. The force sensor 20 pushes against the engagement slide 22, which pushes against the tip 26, which engages the button 14 (or other component) of the device 12. While the driver 42 applies the force to the drive rod 40, the sensor 44 of the motor 16 determines a position of the drive rod 40 and sends a signal representative of the position to the controller 24. The controller 24 may receive the signal and direct the driver 42 to continue applying the force until the detected position is within an acceptable range near the desired maximum position.

The controller 24 may be configured to direct the driver 42 to apply a force to the drive rod 40 so that the drive rod 40 retracts, or moves away from the device 12. The drive rod 40 pulls on the force limiter 18, which—if the force from the drive rod 40 is below the maximum amount—pulls on the force sensor 20 with substantially the same force as the drive rod 40. The force sensor 20 detects the force applied by the force limiter 18, sends a signal representative of the amount of force, and pulls on the engagement slide 22. The controller 24 may receive the signal, determine whether the force is within an allowable range near the desired force, and adjust a parameter of the driver 42 based on the detected force. The force sensor 20 pulls the engagement slide 22, which pulls the tip 26, which moves away from the button 14 (or other component) of the device 12. While the driver 42 applies the force to the drive rod 40, the sensor 44 of the motor 16 determines a position of the drive rod 40 and sends a signal representative of the position to the controller 24. The controller 24 may receive the signal and direct the driver 42 to continue applying the force until the detected position is within an acceptable range near the desired minimum position.

When the force applied by the drive rod 40 exceeds the maximum force when extending from the housing 38, the expansion force of the extension spring 64 is overcome so that the spring engagement device 66 passes by the abutment 76, engages the extension washer 60, and pushes against the extension washer 60 which pushes against the extension spring 64 so that the extension spring 64 is compressed, thereby absorbing the force above the maximum amount, as depicted in FIG. 5. When the force applied by the drive 40 exceeds the maximum force when retracting into the housing 38, the expansion force of the retraction spring 62 is overcome so that the spring engagement device 66 passes by the abutment 76, engages the retraction washer 58, and pushes against the retraction washer 58 which pushes against the retraction spring 62 so that the retraction spring 62 is compressed, thereby absorbing the force above the maximum amount.

The maximum amount allowed by the force limiter 18 may be adjusted by rotating the inner sleeve 52 via the grip-able portion 72, thereby adjusting a distance between the inner sleeve 52 and the rod outer sleeve 54 and/or a distance between the inner sleeve 52 and the sensor outer sleeve 56. Increasing the distance between retraction end 68 of the inner sleeve 52 and the rod outer sleeve 54 decreases the maximum amount of force that the drive rod 40 can apply to the force limiter 18 when retracting. Decreasing the distance between retraction end 68 of the inner sleeve 52 and the rod outer sleeve 54 increases the maximum amount of force that the drive rod 40 can apply to the force limiter 18 when retracting. Increasing the distance between extension end 70 of the inner sleeve 52 and the sensor outer sleeve 56 decreases the maximum amount of force that the drive rod 40 can apply to the force limiter 18 when extending. Decreasing the distance between extension end 70 of the inner sleeve 52 and the sensor outer sleeve 56 increases the maximum amount of force that the drive rod 40 can apply to the force limiter 18 when extending. The grip-able portion 72 may be engaged and turned so that the threads 78, 80 on either ends 68, 70 of the inner sleeve 52 engage the corresponding grooves 90, 104 of the outer sleeves 54, 56. The maximum force when the drive rod 40 is extending from the housing 38 may be the same or different than the maximum force when the drive rod 40 is retracting into the housing 38. For example, the sensor outer sleeve 56 may be turned with the inner sleeve 52 while the rod outer sleeve 54 is held in place. This would cause a change in the distance between retraction end 68 of the inner sleeve 52 and the rod outer sleeve 54, but not change the distance between the extension end 70 of the inner sleeve 52 and the sensor outer sleeve 56.

Figure 9:
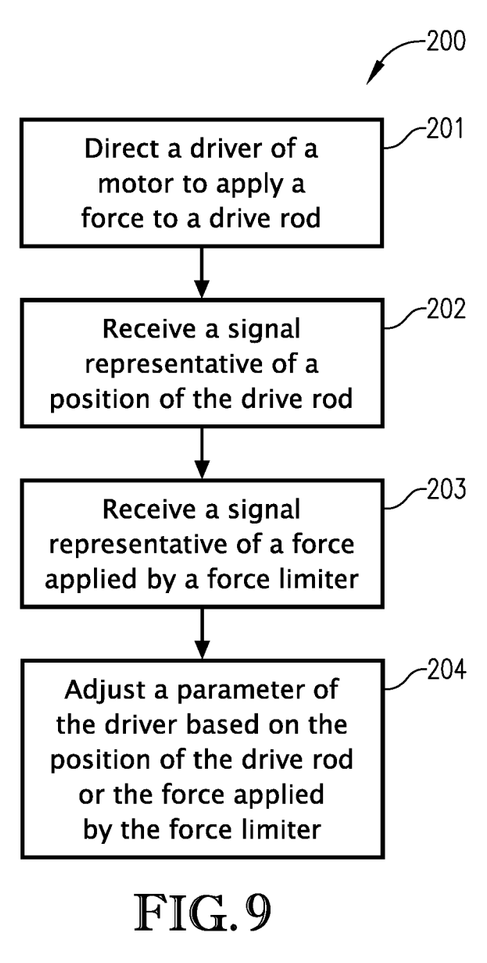
FIG. 9 is a flowchart illustrating a method of engaging an object according to an embodiment of the present invention.

The flow chart of FIG. 9 depicts the steps of an exemplary method 200 of engaging an object. In some alternative implementations, the functions noted in the various blocks may occur out of the order depicted in FIG. 9. For example, two blocks shown in succession in FIG. 9 may in fact be executed substantially concurrently, or the blocks may sometimes be executed in the reverse order depending upon the functionality involved. In addition, some steps may be optional.

The method 200 is described below, for ease of reference, as being executed by exemplary devices and components introduced with the embodiments illustrated in FIGS. 1-8. The steps of the method 200 may be performed by the controller 24 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 201, a driver of an electric linear motor is directed, via a controller, to apply a force to a drive rod. The driver may be directed to apply an extension force whereby the drive rod is pushed outwardly or to apply a retraction force whereby the drive rod is pulled inwardly. The drive rod may be connected to a first end of a force limiter configured to absorb force from the drive rod above a maximum amount. A second end of the force limiter may be attached to a force sensor, which is positioned between the force limiter and an engagement slide. The force sensor may detect an amount of force applied by the force limiter. The outward movement of the drive rod may cause a tip attached to the engagement slide to engage a portion of the object.

Referring to step 202, a signal representative of a position of the drive rod may be received from a sensor of the motor. For example, the sensor may detect the position of the drive rod and send a signal representative of the position to the controller.

Referring to step 203, a signal representative of an amount of force applied by the force limiter is received from the force sensor. The amount of force may include the amount of extension force applied by the force limiter or the amount of retraction force applied by the force limiter.

Referring to step 204, a parameter of the driver may be adjusted based on at least one of the position of the drive rod or the amount of force applied by the force limiter on the force sensor. For example, an amount of electric current provided to the driver, a voltage applied to the driver, an amount of power provided to the driver, an amount of time of operation of the driver, or the like may be adjusted via the controller to achieve a desired position and/or a desired force.

The method 200 may include additional, less, or alternate steps and/or device(s), including those discussed elsewhere herein. For example, one or more bearings that guide the engagement slide may be adjusted so that the tip engages a desired portion of the object. Additionally, the force limiter may be adjusted to change a maximum extension force or a maximum retraction force.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A precision triggering mechanism for engaging a portion of a device, the precision triggering mechanism comprising:
  an electric linear motor including—
    a drive rod,
    a driver that applies a force to the drive rod to move the drive rod linearly, and
    a sensor for detecting a linear position of the drive rod;
  a force limiter connected to the drive rod and configured to absorb an amount of axial force asserted by the drive rod above a maximum amount;
  a force sensor connected to the force limiter and configured to detect an amount of force applied by the force limiter on the force sensor;
  an engagement slide having an end extending from the force sensor for engaging the portion of the device; and
  a controller configured to—
    receive a signal representative of the linear position of the drive rod from the sensor of the electric linear motor,
    receive from the force sensor a signal representative of the amount of force applied by the force limiter, and
    direct the driver of the electric linear motor to apply a force to the drive rod based on at least one of the linear position of the drive rod or the amount of force applied by the force limiter.

2. The precision triggering mechanism of claim 1, wherein the force limiter comprises—
  an inner sleeve including—
    a retraction end,
    an extension end opposite to the retraction end,
    a channel extending from the retraction end through the extension end, and
    an abutment inside the channel between the retraction end and the extension end;
  a rod outer sleeve including—
    a coupling end having an opening that receives a portion of the retraction end of the inner sleeve,
    a rod end having a wall with a through-hole that receives the drive rod of the electric linear motor, and
    a channel extending from the wall of the rod end to the opening of the coupling end;
  a sensor outer sleeve including—
    a coupling end having an opening that receives a portion of the extension end of the inner sleeve, and
    an attachment end attached to the force sensor;
  a retraction washer positioned in the retraction end of the inner sleeve inside the channel of the inner sleeve;
  an extension washer positioned in the extension end of the inner sleeve inside the channel of the inner sleeve;
  a retraction spring extending from the wall of the rod end of the rod outer sleeve to the retraction washer;
  an extension spring extending from the attachment end of the sensor outer sleeve to the extension washer; and
  a spring engagement device attached to the end of the drive rod and positioned between the retraction washer and the extension washer and operable to move past the abutment of the inner sleeve and engage the extension washer when an extension force applied by the drive rod on the force limiter exceeds a maximum extension force, thereby compressing the extension spring.

3. The precision triggering mechanism of claim 2, wherein the spring engagement device is operable to move past the abutment of the inner sleeve and engage the retraction washer when a retraction force applied by the drive rod on the force limiter exceeds a maximum retraction force, thereby compressing the retraction spring.

4. The precision triggering mechanism of claim 3, wherein—
  the inner sleeve comprises an exterior surface having a grip-able portion;
  the retraction end of the inner sleeve includes threads extending radially outwardly from the retraction end;
  the extension end of the inner sleeve includes threads extending radially outwardly from the extension end;
  the coupling end of the rod outer sleeve includes grooves operable to engage the threads of the retraction end of the inner sleeve;
  the coupling end of the sensor outer sleeve includes grooves operable to engage the threads of the extension end of the inner sleeve; and
  the grip-able portion is operable to be turned to adjust relative positions of the inner sleeve and the rod outer sleeve and the sensor outer sleeve, thereby adjusting at least one of the maximum extension force or the maximum retraction force.

5. The precision triggering mechanism of claim 1, wherein the controller is configured to direct the driver of the electric linear motor to push the drive rod so that the linear position of the drive rod does not extend past a maximum position.

6. The precision triggering mechanism of claim 1, wherein the controller is configured to direct the driver of the electric linear motor to retract the drive rod so that the linear position of the drive rod does not retract beyond a minimum position.

7. The precision triggering mechanism of claim 1, wherein the controller is configured to direct the driver of the electric linear motor to push the drive rod so that the amount of force applied by the force limiter does not exceed a maximum force.

8. The precision triggering mechanism of claim 1, further comprising a bracket that supports the electric linear motor, the bracket including a first end, a second end opposite to the first end, and a flange attached to the first end.

9. The precision triggering mechanism of claim 8, wherein the electric linear motor includes a housing that houses the drive rod and the driver and is attached to the flange of the bracket.

10. The precision triggering mechanism of claim 8, further comprising a plurality of guide bearings attached to the bracket and positioned to guide the engagement slide when the engagement slide moves relative to the bracket.

11. The precision triggering mechanism of claim 10, wherein the engagement slide includes a pair of ridges protruding on opposite sides of the engagement slide.

12. The precision triggering mechanism of claim 11, wherein the plurality of guide bearings comprise grooves configured to receive one of the ridges of the engagement slide.

13. The precision triggering mechanism of claim 1, further comprising a tip connected to the end of the engagement slide for contacting the portion of the device.

14. A method of engaging a portion of an object, the method comprising:
directing, via a controller, a driver of an electric linear motor to drive a drive rod outwardly to cause a tip of an engagement slide to engage the portion of the object;
receiving, from a sensor of the electric linear motor, a signal representative of a position of the drive rod;
receiving, from a force sensor, a signal representative of an amount of force applied by a force limiter connected to the drive rod on the force sensor; and
adjusting, via the controller, a parameter of the driver of the electric linear motor based on at least one of the position of the drive rod or the amount of force applied by the force limiter on the force sensor.

15. The method of claim 14, further comprising
comparing, via the controller, the position of the drive rod with a desired maximum position; and
comparing, via the controller, the amount of force applied by the force limiter on the force sensor with a desired extension force amount.

16. The method of claim 15, wherein the force limiter is configured to absorb an amount of axial force asserted by the drive rod on the force limiter that is above a force limiter maximum limit.

17. The method of claim 16, wherein the force limiter maximum limit is greater than the desired extension force amount.

18. The method of claim 14, further comprising directing, via the controller, the driver of the electric linear motor to retract the drive rod.

19. The system of claim 18, further comprising
comparing, via the controller, the position of the drive rod with a desired minimum position; and
comparing, via the controller, the amount of force applied by the force limiter on the force sensor with a desired retraction force amount.

20. A precision triggering mechanism for engaging a portion of a device, the precision triggering mechanism comprising:
a bracket including a first end, a second end opposite to the first end, and a flange attached to the first end;
an electric linear motor including—
a housing attached to the flange,
a drive rod extending from the housing and comprising an end that extends past the flange of the first end of the bracket,
a driver that applies a force to the drive rod to move the end of the drive rod linearly relative to the bracket, and
a sensor for detecting a linear position of the drive rod;
a force limiter connected to the end of the drive rod and configured to absorb an amount of axial force asserted by the drive rod above an adjustable limit;
a force sensor connected to the force limiter and configured to detect an amount of force applied by the force limiter on the force sensor;
an engagement slide having a first end in contact with the force sensor, a second end extending away from the first end above the bracket, and a pair of ridges protruding on opposite sides of the engagement slide and extending from the first end to the second end;
a plurality of guide bearings attached to the bracket and having grooves that receive one of the ridges of the engagement slide so that the guide bearings guide the engagement slide when the engagement slide moves relative to the bracket;
a tip connected to the second end of the engagement slide for contacting the portion of the device; and
a controller configured to—
receive a signal representative of the linear position of the drive rod from the sensor of the electric linear motor,
receive from the force sensor a signal representative of the amount of force applied by the force limiter, and
direct the driver of the electric linear motor to apply a force to the drive rod based on at least one of the linear position of the drive rod or the amount of force applied by the force limiter.

* * * * *